US008705604B2

(12) United States Patent
Goodman et al.

(10) Patent No.: US 8,705,604 B2
(45) Date of Patent: Apr. 22, 2014

(54) METHOD AND APPARATUS FOR COMPLEX IN-PHASE/QUADRATURE POLYPHASE NONLINEAR EQUALIZATION

(75) Inventors: Joel I. Goodman, Chelmsford, MA (US); Benjamin A. Miller, Cambridge, MA (US); Matthew A. Herman, Boston, MA (US); James Edwin Vian, Westford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 464 days.

(21) Appl. No.: 12/963,128

(22) Filed: Dec. 8, 2010

(65) Prior Publication Data
US 2012/0147943 A1     Jun. 14, 2012

(51) Int. Cl.
*H03H 7/30* (2006.01)
*H03H 7/40* (2006.01)
*H03K 5/159* (2006.01)

(52) U.S. Cl.
USPC ............................. 375/232; 375/230; 333/18

(58) Field of Classification Search
None
See application file for complete search history.

(56) References Cited

U.S. PATENT DOCUMENTS

| 5,809,069 | A  | * | 9/1998  | Polley et al. | 375/222 |
|-----------|----|---|---------|---------------|---------|
| 6,301,298 | B1 | * | 10/2001 | Kuntz et al.  | 375/232 |
| 6,760,577 | B2 | * | 7/2004  | Li            | 455/323 |
| 6,952,444 | B1 | * | 10/2005 | Segal et al.  | 375/232 |
| 7,027,487 | B2 | * | 4/2006  | Hattori et al.| 375/147 |
| 7,164,741 | B2 |   | 1/2007  | Harris        |         |

OTHER PUBLICATIONS

International Search Report for PCT/US2011/062858 dated Sep. 20, 2012.
Crochiere, Ronald E. and Rabiner, Lawrence R., *Multirate Digital Signal Processing*, 1983, Prentice Hall, pp. 127-192.
Divi, V. and Wornell, G., "Signal recovery in time-interleaved analog-to-digital converters," *Proc. IEEE ICASSP*, pp. 593-596, 2004.
Goodman, J. et al. "Extending the dynamic range of RF receivers using nonlinear equalization," *Waveform Diversity and Design Conference*, 2009 International. 2009. 224-228. © 2009 IEEE.
Goodman, J. et al. "Polyphase Nonlinear Equalization of Time-Interleaved Analog-to-Digital Converters," *Selected Topics in Signal Processing, IEEE Journal of 3.3* (2009): 362-373. © 2009 Institute of Electrical and Electronics Engineers.
Looney, M., "Advanced Digital Post-Processing Techniques Enhance Performance in Time-Interleaved ADC Systems", *Analog Dialogue* 37-8, Aug. 2003, pp. 1-5.
Miller, B. et al., "A Polyphase nonlinear equalization architecture and semi-blind identification method," *2008 42nd Asilomar Conference on Signals, Systems and Computers* (Oct. 2008), p. 593-597.
Reeder, R. et al. "Pushing the State of the Art with Multichannel A/D Converters," *Analog Dialogue* 39-05, May (2005).
Soudan, S. et al. "On Time-Interleaved Analog-to-Digital Converters for Digital Transceivers," *2009 IEEE International Symposium on Circuits and Systems* (May 24, 2009-May 27, 2009 Taipei, TWN).
Vogel, C., "Time-interleaved analog-to-digital converters: Status and future directions," *2006 IEEE International Symposium on circuits and systems*, p. 4, 2006.

* cited by examiner

*Primary Examiner* — Shuwang Liu
*Assistant Examiner* — Gina McKie
(74) *Attorney, Agent, or Firm* — Cooley LLP (57) ABSTRACT

Complex polyphase nonlinear equalizer (cpNLEQs) mitigate nonlinear distortions generated by complex in-phase/quadrature (I/Q) time-interleaved analog-to-digital converters (TIADCs). Example cpNLEQs upsample the digital waveform emitted by the TIADC, e.g., by a factor of two, then separate the upsampled digital waveform into upsampled in-phase and quadrature components. Processors in the cpNLEQs create real and imaginary nonlinear compensation terms from the upsampled in-phase and quadrature components. The nonlinear compensation terms are downsampled, and the downsampled imaginary nonlinear compensation term is phase-shifted, then combined with the downsampled real component to produce an estimated residual distortion. Subtracting the estimated residual distortion from the digital waveform emitted by the TIADC yields an equalized digital waveform suitable for further processing.

23 Claims, 7 Drawing Sheets

METHOD AND APPARATUS FOR COMPLEX IN-PHASE/QUADRATURE POLYPHASE NONLINEAR EQUALIZATION

GOVERNMENT SUPPORT

This invention was made with government support under Air Force contract FA8721-05-C-0002 awarded by the Defense Advanced Research Project Agency (DARPA). The government has certain rights in the invention.

BACKGROUND

There are many different signal processing applications that benefit from adjusting the relative behavior of certain signal components. This so-called equalization can boost or weaken the energy of a specific frequency or frequency band, or adjust other frequency-dependent signal attributes such as phase or time delay. A time-interleaved analog-to-digital converter (TIADC) is one such application. A TIADC uses N parallel channels, each of which runs at a sample rate that is 1/N of the system sample rate, to convert an analog waveform into a digital signal. Each channel has its own sample-and-hold (S/H) circuit coupled to a respective ADC, which trigger on every Nth clock pulse from the TIADC's clock. In a four-channel TIADC, for example, the first channel samples the analog input on the first, fifth, ninth, etc. clock pulses; the second channel samples the analog input on the second, sixth, tenth, etc. clock pulses; and so on. A digital multiplexer interleaves the digital outputs from each channel to produce a fullband digital representation of the analog input waveform.

TIADCs can operate at higher frequencies with greater dynamic range than conventional ADCs, making them suitable for software-defined radio, test and measurement (e.g., in oscilloscopes), medical imaging, precise medicine dispensers (fluid flow measurement), synthetic aperture radar, digital beam-forming communication systems, and other applications that require high-speed analog-to-digital conversion.

Ideally, the timing phases of the sampling clocks to the constituent converters are adjusted such that the digitized samples at the output of the TIADC are spaced evenly in time. This enables a TIADC to achieve an effective sample rate of N times the sample rate of any individual converter operating in isolation, where N is the number of on-chip ADCs. However, small gain and phase mismatches in the linear and nonlinear responses of the individual ADCs create unwanted spurs that can in some cases dominate the TIADC's spurious and/or intermodulation-free dynamic range. These distortions, referred to here as "mismatch distortions," are nonlinear distortions that occur at frequencies that do not correspond to polynomial combinations of the input signal. Spurious mismatch distortions may make the TIADC output unsuitable for further processing.

SUMMARY

Polyphase nonlinear equalization (pNLEQ) of a digital signal, such as one or more digital signals output from a TIADC, compensates for the mismatch distortions that cause unwanted spurs. In pNLEQ, a polynomial filter generates nonlinear compensation terms from a copy of the TIADC's digital output. In some cases, each nonlinear compensation term represents the nonlinearity present in the output of a respective channel in the TIADC. Subtracting the nonlinear compensation terms from a delayed version of the TIADC's digital output yields a digital output with dramatically attenuated spurs. Standard pNLEQ is not well-suited to compensating for mismatches in complex in-phase and quadrature (I/Q) TIADCs because of ambiguities due to sub-Nyquist sampling by each TIADC.

Fortunately, a new variant of pNLEQ, called complex pNLEQ (cpNLEQ), overcomes limitations associated with sub-Nyquist sampling of the individual ADCs in the TIADC. In cpNLEQ, one or more processors create real and imaginary nonlinear compensation terms from upsampled in-phase and quadrature components, respectively, of a complex digital signal. Downsamplers coupled to the processor downsample the in-phase and quadrature nonlinear compensation term components to produce downsampled in-phase and quadrature nonlinear compensation terms. A phase shifter applies a predetermined phase shift (e.g., 90° to the downsampled quadrature nonlinear compensation term(s) to generate phase-shifted quadrature nonlinear compensation term(s), which a summer combines with the downsampled in-phase nonlinear compensation term to produce an estimated residual distortion. Another summer subtracts the estimated residual distortion from the complex digital signal to yield an equalized complex digital signal.

In certain embodiments, two TIADCs capture the complex digital signal from an analog waveform. Upsamplers coupled to the TIADCs transform the complex digital signal into an upsampled complex digital signal, which is then quadrature demodulated to produce the upsampled real and quadrature components. The upsamplers may upsample the complex digital waveform by a predetermined factor, e.g., a factor of two or more. The downsamplers can likewise downsample the nonlinear compensation terms by the same predetermined factor, e.g., a factor of two or more.

Each TIADC may include a plurality of samplers (e.g., one sampler for each channel in the TIADC), each of which operates on the analog waveform at a predetermined time delay. Each of the samplers in each TIADC operates at a sampling rate that is lower than the TIADC's sampling rate.

The analog waveform, which may be captured by a receiver operably coupled to the TIADC, typically has a bandwidth that is greater than the Nyquist rate of the individual ADCs in the TIADC. In some cases, the analog waveform occupies a frequency band ranging from direct current (DC) to the sampling frequency of the TIADC.

BRIEF DESCRIPTION OF THE DRAWINGS

The drawings are not necessarily to scale, emphasis instead being placed upon illustrating embodiments of the present invention.

DETAILED DESCRIPTION

A description of example embodiments of the invention follows. The example embodiment discussed below is one where a complex polyphase nonlinear equalization (cpN- LEQ) method or apparatus operates to equalize the digital outputs of a time-interleaved analog-to-digital converter (TIADC) serving as part of a digital radio receiver. However, it should be understood that other end uses of cpNLEQ are possible.

Figure 1:
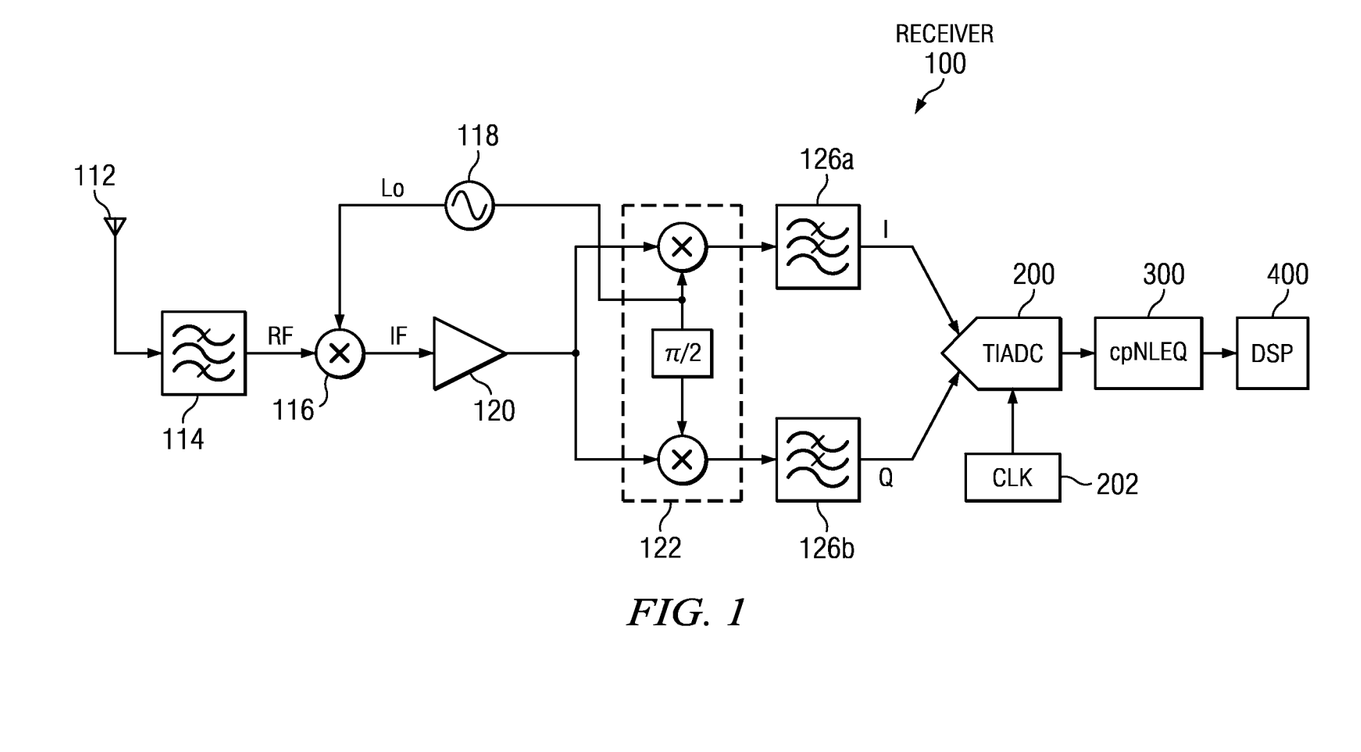
FIG. 1 is a block diagram of a receiver that includes a complex in-phase/quadrature polyphase nonlinear equalizer coupled to a TIADC.

FIG. 1 shows a super-heterodyne receiver 100 suitable for use in a software-defined radio or other wireless application that employs broadband analog waveforms. An antenna 112 detects a radio-frequency (RF) analog waveform, which is filtered with a filter 114, then (optionally) downconverted to an intermediate frequency (IF) with a mixer 116 driven by a local oscillator (LO) from a synthesizer 118. A low-noise amplifier 120 boosts the strength of the downconverted analog signal, which is separated into in-phase and quadrature components with a complex I/Q demodulator 122. Those skilled in the art will appreciate that in some cases the analog waveform received by the antenna 112 may be downconverted to an IF above baseband (i.e., above DC). In other cases, the TIADC 200 may operate at a sampling rate that is high enough to operate directly on the received analog waveform (i.e., the receiver 100 may not downconvert the analog waveform).

Two image-rejection (anti-aliasing) filters 126a and 126b filter the in-phase and quadrature components I and Q, respectively, to produce filtered in-phase and quadrature components I and Q that feed a TIADC 200 controlled by a clock 202. The TIADC 200 samples and converts the in-phase and quadrature portions into digitized in-phase and quadrature components, respectively, that can be combined to form a complex digital representation of the analog input. The in-phase and quadrature channels in the TIADC 200 each include a plurality of samplers, each operating at predetermined delays staggered at intervals of 1/NB such that each sampler samples the in-phase (or quadrature) portion every 1/B seconds.

Gain, phase, and offset mismatches among the individual ADCs in the TIADC 200 distort the complex digital signal produced by the TIADC 200. These mismatches cause offset and image spurs to appear in the TIADC 200 output at frequencies that depend on the sampling frequencies of the ADCs in the TIADC 200 and the spectral content of the analog input. A complex polyphase nonlinear equalizer (cpNLEQ) 300 reduces distortion in the complex digital signal emitted from the TIADC 200 to produce a high-dynamic range complex digital signal suitable for further processing by a digital signal processor (DSP) 400.

Complex I/Q TIADCs

Figure 2:
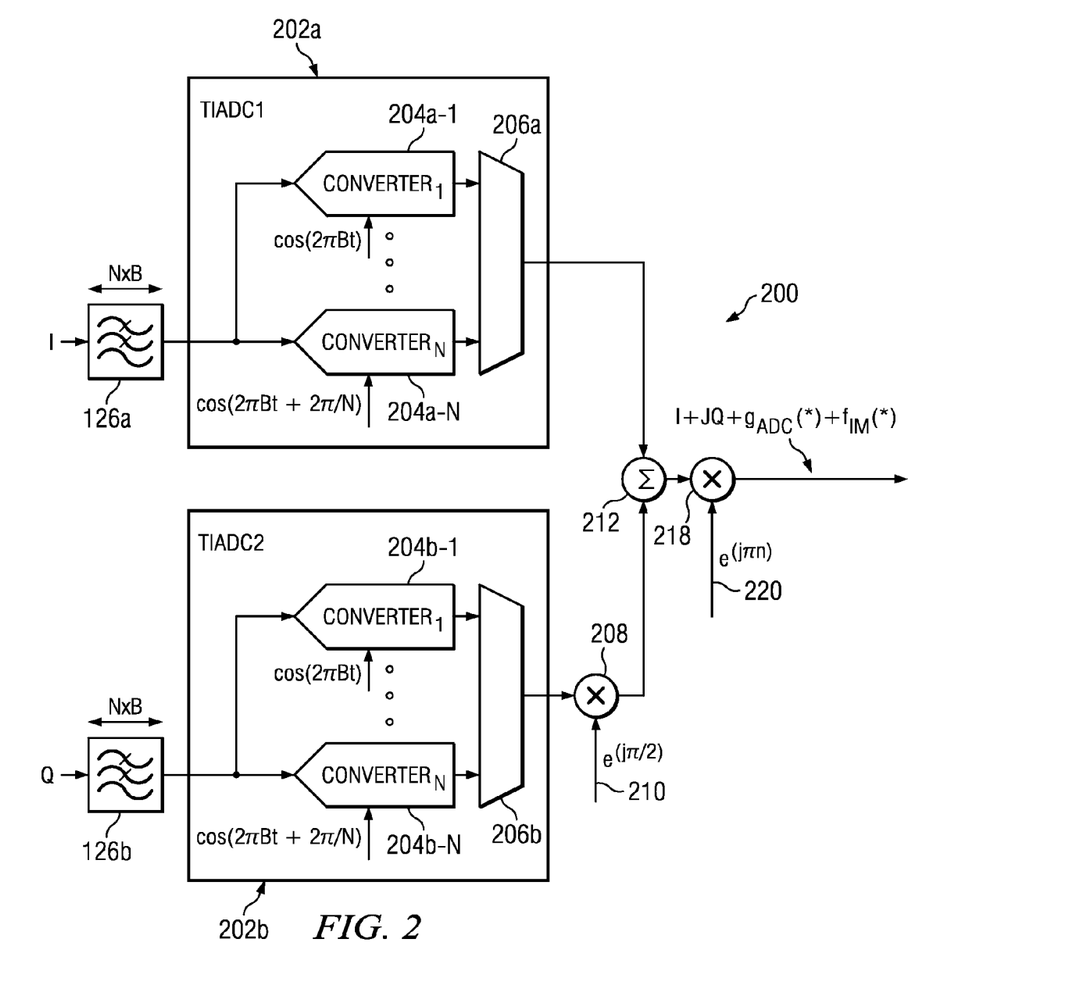
FIG. 2 is a block diagram of a TIADC.

FIG. 2 shows that the complex I/Q TIADC 200 includes two TIADCs 202a and 202b that operate in parallel on the in-phase and quadrature components I and Q of the analog waveform with a bandwidth of NB. The in-phase TIADC 202a and quadrature TIADC 202b include N individual ADCs 204a and 204b, respectively, arranged to operate in parallel on the in-phase and quadrature components I and Q, respectively. Each individual ADC 204a-i, 204b-i operates on the input at a staggered sampling rate of B, giving the in-phase and quadrature TIADCs 202a and 202b each an aggregate sampling rate of NB, which is only one-half the Nyquist sampling rate for an analog waveform with a bandwidth NB. In other words, the in-phase and quadrature TIADCs 202a and 202b operate at sub-Nyquist sampling rates. However, the in-phase and quadrature TIADCs 202a and 202b operate on complementary streams of data, so the complex I/Q TIADC 200 output spans the same bandwidth NB.

Multiplexers 206a and 206b interleave the outputs from the individual ADCs 204a and 204b, respectively, to create digital representations of the in-phase and quadrature components I and Q. A digital multiplier 208 shifts the digitized quadrature component Q by a phase shift 210 (e.g., $\pi/2$), and a summer 212 combines the phase-shifted quadrature component Q with the in-phase component I to produce a complex digital output. In some cases, the complex digital output may be frequency shifted with another mixer 220 by a digital frequency shift 220 (e.g., $\pi$) to obtain a complex waveform spanning a band from $-NB/2$ to $NB/2$.

In this case, each sub-TIADC 202a and 202b samples the input signal at half the Nyquist rate, thereby preventing pNLEQ from being directly applied to each individual sub-TIADC 202a, 202b due to an ambiguity created by sub-Nyquist sampling. To see how this ambiguity arises, consider a complex analog waveform x(t) at the input of the TIADC 200:

$$x(t)=x_I(t)\cos(\Omega_C t)-x_Q(t)\sin(\Omega_C t),$$

where $\Omega_C$ is $2\pi$ times the carrier frequency and where $x_I(t)$ and $x_Q(t)$ represent the amplitudes of the real (in-phase) and imaginary (quadrature) components, respectively, of the analog waveform. After quadrature mixing, the output of in-phase TIADC 202a is given by:

$$\tilde{x}_I(n)=\tilde{x}_b(n)+\tilde{x}_b^*(n),$$

where $\tilde{x}_b(n)=x_b(n)\exp(j\pi n/2)$ represents the baseband waveform sampled in the second Nyquist zone (i.e., the band from $f_s/2$ to $f_s$, where $f_s$ is the sampling rate) and the operator $(.)^*$ corresponds to the complex conjugate of the argument. Similarly, the output of quadrature the TIADC 202b, after quadrature mixing, is given by:

$$\tilde{x}_Q(n)=\tilde{x}_b(n)\exp(j\pi n/2)+\tilde{x}_b^*(n)\exp(-j\pi n/2).$$

Combining the outputs of the in-phase and quadrature TIADCs 202a and 202b yields the complex digital signal:

$$x(n)=I+jQ+g_{ADC}+f_{IM},$$

where I is the in-phase component of the signal, Q is the quadrature component, $g_{ADC}$ represents the composite nonlinearities imparted by the complex I/Q TIADC 200, and $f_{IM}$ represents the (linear) amplitude and phase imbalance across the I and Q channels of the complex I/Q TIADC 200.

If the analog input waveform has a bandwidth NB and the samplers 202a and 202b sample the analog input a waveform at a rate NB in the first and second Nyquist zones (i.e., IF sampling, where the first and second Nyquist zones are the bands from 0 to $f_s/2$ and $f_s/2$ to $f_s$, respectively, given a sampling rate $f_s$), then aliased components associated with each input frequency $f_{in}$ will appear in the complex digital signal at intervals of $2\pi f_{in}/NB$ modulo $2\pi$. For example, if the TIADC bandwidth is NB=2 GHz and the analog input includes a tone at $f_{in}$=1.5 GHz, then an aliased component will appear in the digital spectrum at $\pi/4$ (i.e., at a frequency of 0.5 GHz). Unfortunately, the aliased component may be indistinguishable from a tone at the receiver input at the frequency $f_{in}$=0.5 GHz.

The presence of potentially ambiguous aliased components makes it difficult to equalize the outputs of complex I/Q TIADCs using polyphase nonlinear equalization (pNLEQ). As described above, pNLEQ involves generating compensation terms for a distorted digital waveform, then subtracting the compensation terms from the distorted digital waveform to produce an equalized digital waveform. Given that the compensation terms are created by taking nonlinear combinations of the strong input signals that are measured after digitization, pNLEQ is not suitable for equalizing complex digital signals distorted by spurs, such as the signals from complex I/Q TIADCs. Although increasing the sampling rate of the in-phase and quadrature channels in the complex I/Q TIADC would eliminate the aliasing that precludes pNLEQ, increasing the sampling rate is not necessarily feasible due to a dearth of fast ADCs and limits on the number of ADCs that can be interleaved together.

Complex Polyphase Nonlinear Equalization (cpNLEQ)

Figures 3, 4A:
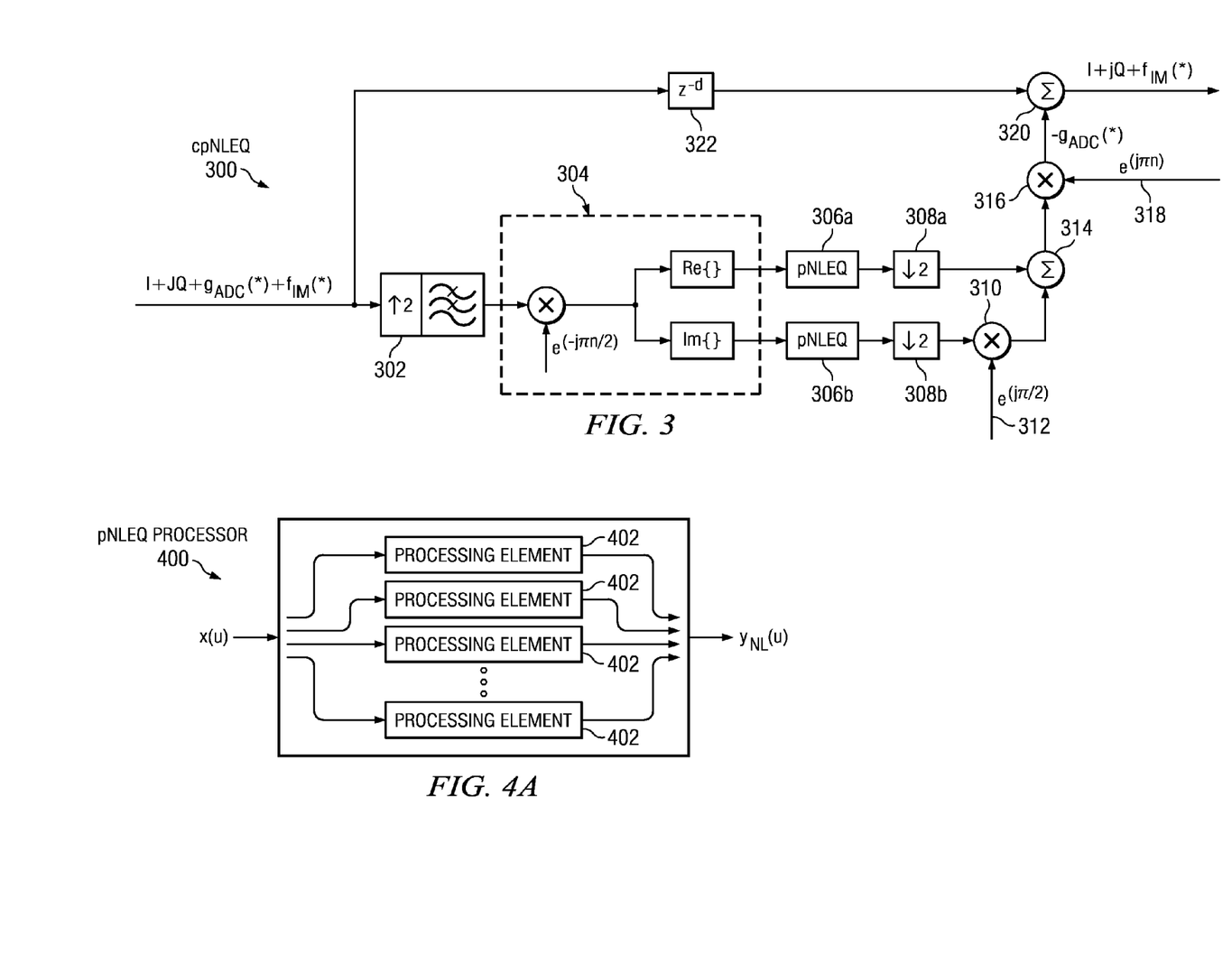
FIG. 3 is a block diagram of a complex in-phase/quadrature polyphase nonlinear equalizer.
FIGS. 4A-4D are block diagrams of architectures suitable for performing complex I/Q polyphase nonlinear equalization.

FIG. 3 is a block diagram of a complex polyphase nonlinear equalizer (cpNLEQ) 300 that mitigates the nonlinear distortions generated by in-phase/quadrature ADCs or in-phase/quadrature TIADCs. The cpNLEQ 300 estimates and removes the error $g_{ADC}$ in the TIADC output due to composite nonlinearities of the TIADC. This mitigation yields an equalized complex digital output that is relatively free of distortion caused by ADC nonlinearities.

To mitigate distortion in a complex digital signal x(n) from the TIADC 200, a copy of the complex digital signal is coupled to an upsampler 302 at the input of the cpNLEQ 300. (A delay block 322 delays another copy of the complex digital signal by a time equal to the time it takes to produce an estimated residual distortion from the first copy of the complex digital signal.) The upsampler 302 upsamples the complex digital signal by a predetermined factor (e.g., two) to produce an upsampled complex digital signal that occupies the digital spectrum from 0 to π and a baseband amplitude that can be represented as the difference between in-phase and quadrature components:

$$\tilde{x}_b(n) = \tilde{x}_I(n) - j\tilde{x}_Q(n).$$

A quadrature demodulator 304 coupled to the upsampler 302 separates the upsampled complex digital signal into upsampled in-phase and quadrature components, which are coupled into first and second pNLEQ processors 306a and 306b, respectively.

The first pNLEQ processor 306a creates real nonlinear compensation terms based on the upsampled in-phase component, and the second pNLEQ processor 306b creates imaginary nonlinear compensation terms based on the upsampled quadrature component. In some cases, the pNLEQ processors 306a and 306b simultaneously mitigate both linear and nonlinear (harmonic and intermodulation) mismatch distortions in the TIADC. Further, the pNLEQ processors 306a and 306b may employ forward-backward sequential estimation or second-order cone programming (SOCP) to find a computationally efficient pNLEQ solution to mitigate distortions with state-dependent behavior, i.e., nonlinearities with memory. For more on forward-backward sequential estimation and SOCP, see J. Goodman et al., "Polyphase Nonlinear Equalization of Time-Interleaved Analog-to-Digital Converters," IEEE J. Sel. Top. Signa., 3(3):362-373 (June 2009).

Downsamplers 308a and 308b coupled to the pNLEQ processors 306a and 306b downsample the compensation terms by a predetermined factor (e.g., two). The downsampling factor may be different from two, but should be the same as the upsampling factor employed by block 302. An optional multiplier 310 applies a phase shift 312 of π/2 to the downsampled complex compensation term, which is combined with the downsampled real compensation term by a summer 314 to yield an estimated residual distortion equal to the TIADC distortion, $g_{ADC}$. Another mixer 316 applies a frequency shift of π to the estimated residual distortion, and a second summer 320 subtracts the phase-shifted estimated residual distortion from the delayed copy of the complex digital signal to produce an equalized complex digital signal. The equalized complex digital signal, $I+jQ+f_{IM}$, is free of distortion caused by nonlinearities in the TIADC 200. In some cases, the cpNLEQ 300 may also be configured to estimate and remove $f_{IM}$, the distortion due to (linear) amplitude and phase imbalances across the I and Q channels of the TIADC 200.

Returning to the above example, when $f_{in}=1.5$ GHz is present at the TIADC input, the output of the TIADC includes the following components:

$$\exp(-j3\pi n/4) + g_{TIADC1} + g_{TIADC2},$$

where exp(-j3πn/4) represents $f_{in}=1.5$ GHz, which can produce an ambiguous aliased tone that appears at 0.5 GHz. The terms $g_{TIADC1} + g_{TIADC2}$ represent the nonlinearities generated by the in-phase and quadrature TIADCs that receive single-tone inputs offset by π/4 from each other. After upsampling and splitting the upsampled in-phase and quadrature components, the digital spectrum of the in-phase and quadrature TIADC channels is the Fourier transform of cos(3nπ/4) and sin(3nπ/4). That is, the analog input at $f$in=1.5 GHz produces tones distributed throughout the digital spectrum at intervals of 3π/2 modulo 2π, which are clearly distinguishable from the tone at π/4 produced by an analog input of $f_{in}=0.5$ GHz.

Upsampling the in-phase and quadrature components of the digital signal eliminates ambiguities caused by sampling the analog input at or below the Nyquist rate. As a result, the upsampled in-phase and quadrature components can be processed using NLEQ, pNLEQ, or any other technique suitable for estimating distortion due to nonlinearities in the TIADC.

Example Nonlinear Equalization (NLEQ) Architectures

The first and second processors 306a and 306b in the cpNLEQ 300 can be implemented in a variety of ways, e.g., in software or in hardware, such as in application-specific integrated circuits (ASICs), field-programmable gate arrays (FPGAs), stored program digital signal processors (DSPs), etc., and/or in a single device. The processors 306a, 306b can have any of many suitable processor architectures, including the architectures described below with respect to FIGS. 4A-4D. In general, the choice of processor architecture depends on factors including but not limited to computational efficiency, power consumption, cost, and size.

FIG. 4A shows a general representation of a processor 400, also known as a nonlinear equalizer, suitable for performing NLEQ on a digital waveform (signal), such as the upsampled in-phase and quadrature components described above. The processor 400 includes a set of processing elements 402 that takes nonlinear combinations of the data to determine a nonlinear compensation term that can be added to or subtracted from the digital waveform to compensate for both polynomial distortions and polynomial mismatch distortions introduced by the TIADC 200. The total number of processing elements can be adjusted according to computational considerations; the processing elements 402 that comprise a set may be unique in their polynomial order, delay values, and filter coefficients.

Some nonlinear equalizers 400 may compute the nonlinear compensation term with a data processing matrix $X_P$ constructed of polynomial series expansions that together represent the nonlinear response of the TIADC 200. For example, the set of processing elements 402 in the nonlinear equalizer 400 may find the product $y_{NL}(n)$ of the data processing matrix and a vector h of the outputs of the individual ADCs 202 in the TIADC 200. Subtracting the product $y_{NL}(n)$, or residual error, from a copy of the digital input waveform that propagates yields a digital output waveform that is relatively free of distortion. Some embodiments of the processor 400 can also compensate for linear mismatch distortions introduced by the TIADC 200.

Figure 4B:
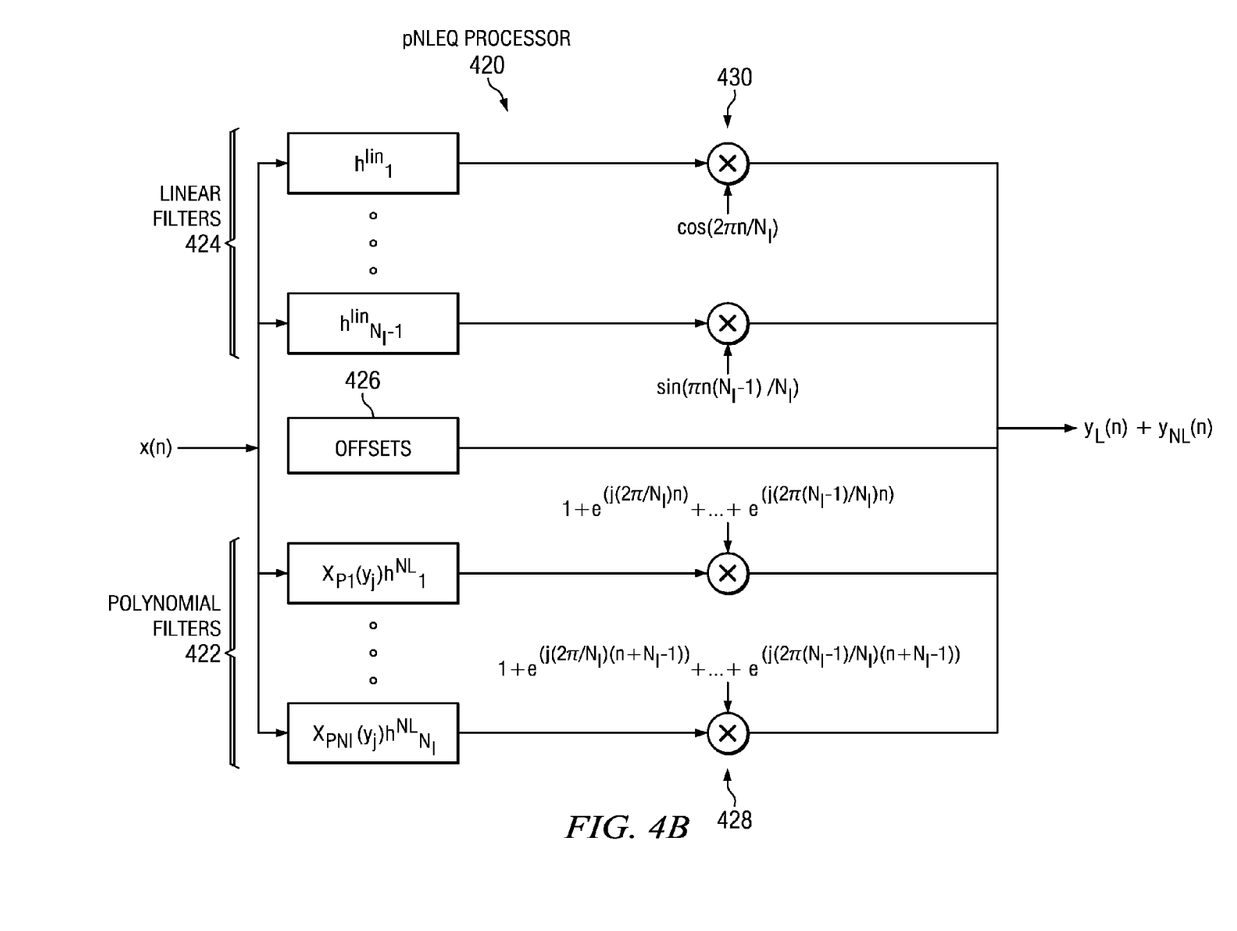

FIG. 4B shows a polyphase NLEQ (pNLEQ) processor 420 with N polynomial filters 422, N-1 linear filters 424, and an offset block 426 suitable for equalizing digital signals from an N-channel TIADC. The polynomial filters 422 are one implementation of the generic processing elements 402 in FIG. 5; each polynomial filter 422 computes the product of a coefficient in the vector h with a row in the data processing matrix to provide a particular nonlinear compensation term.

Mixers 428 driven with offset tones select the outputs of the polynomial filters 422 in a round-robin fashion. For example, if the processor 420 operates on the upsampled in-phase component of the TIADC 200 shown in FIG. 2, then the first polynomial filter output is selected to compensate error in the first ADC 204a-1 of the in-phase TIADC 202a, the second polynomial filter output is selected to compensate error in the second ADC 204a-2 of the in-phase TIADC 202a, and so on.

The pNLEQ processor 420 also includes linear filters 424 that model distortions due to linear frequency-dependent gain and phase mismatches among the ADCs in the TIADC. Mixers 430 upconvert the filter outputs to image frequencies within the digital signal spectrum to form a linear compensation term. Combining the linear compensation term, nonlinear compensation term, and an offset (from the offset block 426) yields the estimated residual error in the digital input waveform. For more detail on the NLEQ and pNLEQ processors shown in FIGS. 5A and 5B, see J. Goodman et al., "Polyphase Nonlinear Equalization of Time-Interleave Analog-to-Digital Converters," IEEE J. Sel. Top. Signa., 3(3): 362-373 (June 2009) and J. Goodman et al., "Extending the Dynamic Range of RF Receivers using Nonlinear Equalization," in Proceedings of the 2009 International Waveform Diversity and Design Conference (Feb. 8-13, 2009), both of which are incorporated herein by reference in their entireties.

Figure 4C:
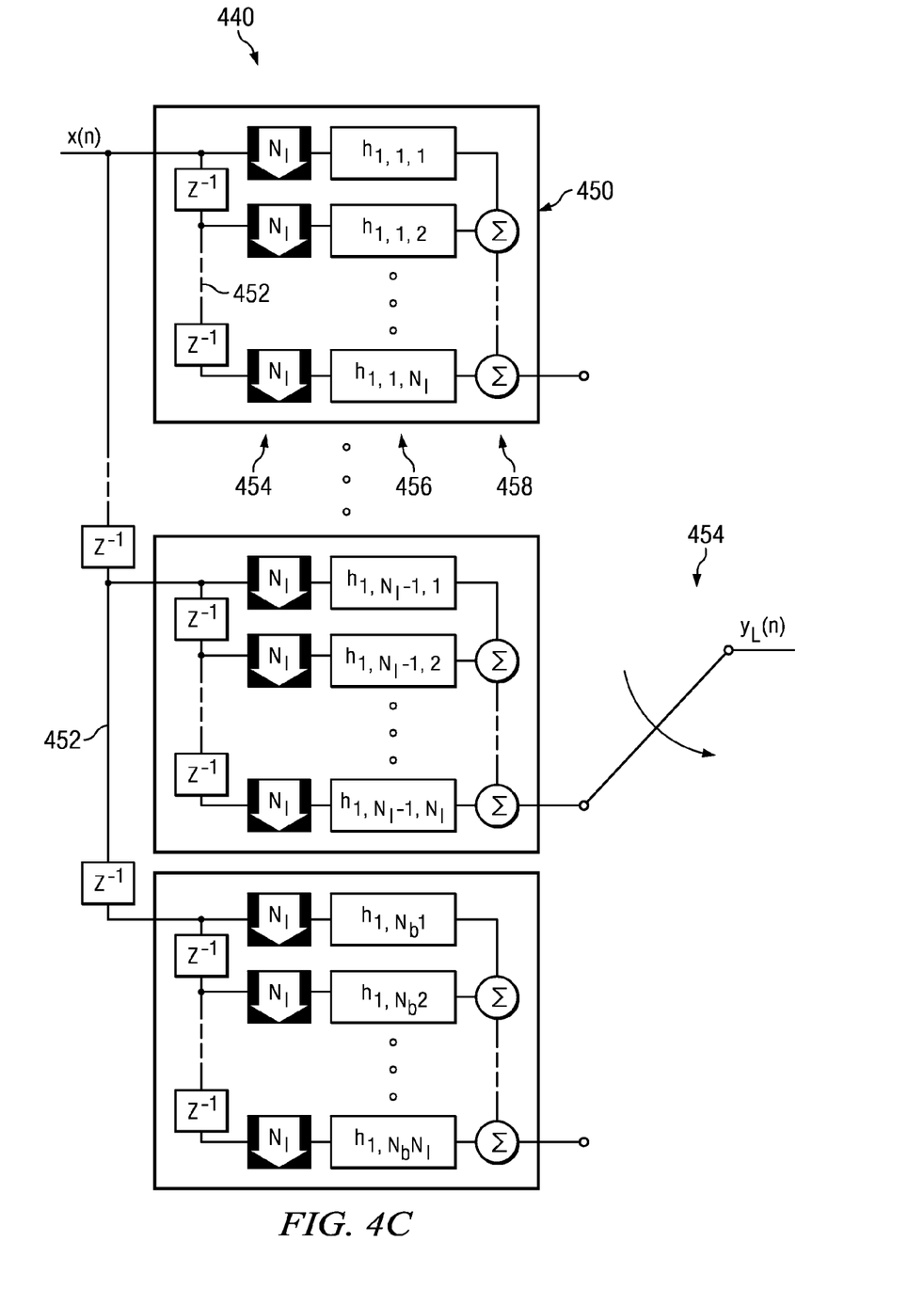

FIG. 4C shows an alternative pNLEQ processor 440 that uses linear polyphase filters 450 coupled in parallel to a tapped delay line 442 to compensate for both linear and nonlinear distortions (e.g., due to linear mismatches) in the output x(n) of an N-channel TIADC. Each linear polyphase filter 450 includes a tapped delay line 452 that splits the filter's digital input into N copies staggered at delay intervals equal in duration to one sample at the full TIADC sampling rate (e.g., at $1/f_s$). Downsamplers 454 coupled to the outputs of the tapped delay line 452 decimate the copies of the digital output by a factor of N. Sub-filters 456 coupled to the downsamplers 454 operate in parallel on the downsampled outputs of the tapped delay line 452, and their outputs are combined with summers 458. Decimating the outputs of the tapped delay before filtering increases the computational efficiency by reducing the total number of samples filtered by each sub-filter 456.

The alternative processor 440 shown in FIG. 4C includes N linear polyphase filters 450 coupled in parallel to an N-output tapped delay line 442, where the delay between taps is the reciprocal of the TIADC sampling frequency. Each linear filter 450 produces a reduced-rate output that addresses the distortion for a particular channel in the TIADC. For example, if the processor 440 operates on the up-sampled in-phase component of the TIADC 200 shown in FIG. 2, then the first linear polyphase filter compensates for the distortion from the first ADC 204a-1 of the in-phase TIADC 202a, the second linear polyphase filter compensates for the distortion from the second ADC 204a-2 of the in-phase TIADC 202a, and so on. A switch 454 interleaves the filter outputs to create a nonlinear compensation term that can be subtracted from a delayed copy of the digital waveform to equalize the digital input.

Figure 4D:
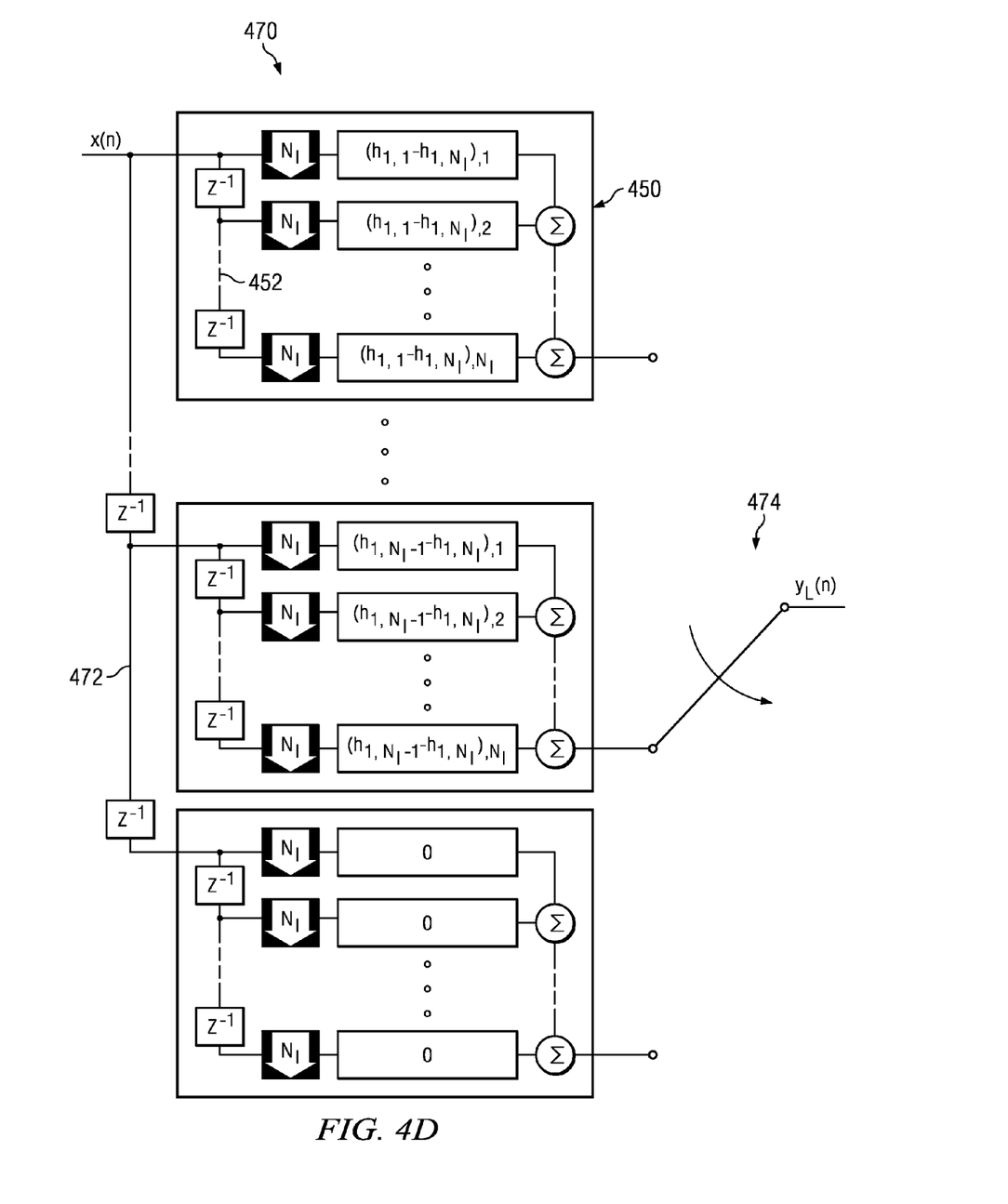

FIG. 4D shows another alternative processor 470 that compensates for nonlinear distortions (e.g., due to linear mismatches) with N-1 linear polyphase filters 450 coupled in parallel to a tapped delay line 472 with N-1 outputs. As above, the delay between taps in the tapped delay line 472 is the reciprocal of the TIADC sampling frequency. Again, each filter 450 operates on the output of a particular channel in the in-phase or quadrature TIADC, and a switch 474 interleaves the filter outputs to create a nonlinear compensation term that can be subtracted from a delayed copy of the digital waveform to equalize the digital input. In this case the mismatches between the filters are the same, so the nonlinear compensation term is the same. For more on the alternative pNLEQ processors shown in FIGS. 4C and 4D, see B. Miller et al., "A Polyphase Nonlinear Equalization Architecture and Semi-blind Identification method," in Proceedings of the 42nd Asilomar Conference on Signals, Systems and Computers (Oct. 26-29, 2008).

One unique aspect of pNLEQ is that it simultaneously suppresses not only frequency-dependent linear mismatch distortions in TIADCs, but also polynomial distortions and polynomial mismatch distortions in a computationally efficient fashion. Existing approaches to achieving computationally efficient polynomial filter architectures for radio-frequency compensation, principally developed to mitigate distortions generated by power amplifiers in transmitters, limit the multidimensional signal space over which the architecture can suppress spectral regrowth and in-band spurs. In contrast, the processors shown in FIGS. 4A-4D search over an unrestricted multidimensional signal space to select polynomial components that yield the highest equalization performance for a given computational complexity, as described in U.S. Pat. No. 7,808,315 to Goodman et al., incorporated herein by reference in its entirety.

Example NLEQ Training Architectures

Figure 5:
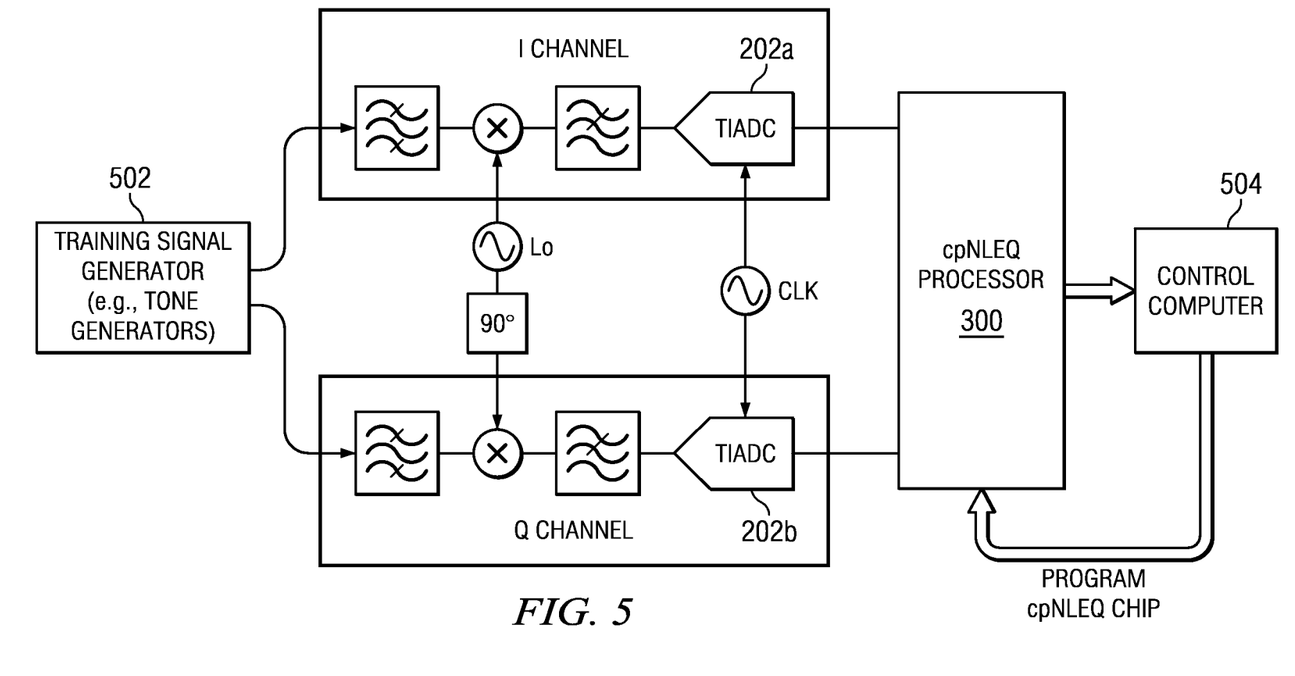
FIG. 5 is a block diagram that illustrates a preferred method of training a complex in-phase/quadrature polyphase nonlinear equalizer coupled to a TIADC.

FIG. 5 illustrates a preferred training process for a cpNLEQ 300 coupled to a complex I/Q TIADC 200 that includes an I/Q receiver. A training signal generator 502 (e.g., a tone generator) coupled to the input of the TIADC 200 excites the receiver with a complex training signal. The TIADC 200 separates the training signal into in-phase and quadrature components as understood in the art, then digitizes the in-phase and quadrature components as described above. The cpNLEQ 300 operates on the output from the TIADC 200 to produce what is nominally a distortion-free digital representation of the complex training signal from the training signal generator 502. A control computer 504 coupled to the output of the cpNLEQ 504 compares this nominally distortion-free digital representation to an expected digital representation of the complex training signal. The control computer 504 computes cpNLEQ parameters (e.g., the filter coefficients described above) and programs the cpNLEQ 300 accordingly. This training process can repeated periodically or as desired to account for changes in the TIADC nonlinearities due to environmental perturbations, drift, etc., as understood by those skilled in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method for equalizing a complex digital signal, the method comprising:

upsampling a copy of the complex digital signal to obtain an upsampled complex digital signal;

separating the upsampled complex digital signal to obtain upsampled in-phase and quadrature components of the complex digital signal;

creating real and imaginary nonlinear compensation terms from the upsampled in-phase and quadrature components, respectively, of the complex digital signal;

downsampling the real and imaginary nonlinear compensation terms to obtain downsampled real and imaginary nonlinear compensation terms;

applying a predetermined phase shift to the downsampled imaginary nonlinear compensation term to obtain a phase-shifted imaginary nonlinear compensation term;

combining the downsampled real nonlinear compensation term with the phase-shifted imaginary nonlinear compensation term to obtain an estimated residual distortion; and subtracting the estimated residual distortion from the complex digital signal to obtain an equalized complex digital signal.

2. The method of claim 1 wherein upsampling the copy of the complex digital signal includes upsampling by a predetermined factor.

3. The method of claim 2 wherein the predetermined factor is two.

4. The method of claim 1 further including capturing the complex digital signal from an analog waveform using a time-interleaved analog-to-digital converter (TIADC).

5. The method of claim 4 further including sampling the analog waveform with a plurality of samplers operably coupled to the TIADC, each sampler in the plurality of samplers having a predetermined time delay.

6. The method of claim 5 further including sampling the analog waveform at a rate below a Nyquist rate of at least one analog-to-digital converter in the TIADC with at least one sampler in the plurality of samplers.

7. The method of claim 4 wherein the analog waveform has a bandwidth greater than a Nyquist rate of at least one analog-to-digital converter in the TIADC.

8. The method of claim 7 wherein the analog waveform occupies a frequency band ranging from direct current to a sampling frequency.

9. The method of claim 4 further including:
receiving the analog waveform with a receiver operably coupled to the TIADC.

10. The method of claim 1 wherein downsampling the equalized real and imaginary nonlinear compensation terms includes downsampling by a predetermined factor.

11. The method of claim 10 wherein the predetermined factor is two.

12. An apparatus for equalizing a complex digital signal, the apparatus comprising:
an upsampler configured to upsample a copy of the complex digital signal to obtain an upsampled complex digital signal;
a filter operably coupled to the upsampler and configured to separate the upsampled complex digital signal into upsampled in-phase and quadrature components of the complex digital signal;
a processor operably coupled to the filter and configured to create real and imaginary nonlinear compensation terms from the upsampled in-phase and quadrature components, respectively, of the complex digital signal;
a downsampler operably coupled to the processor and configured to downsample the real and imaginary nonlinear compensation terms to obtain downsampled real and imaginary nonlinear compensation terms;
a phase shifter operably coupled to the downsampler and configured to apply a predetermined phase shift to the downsampled imaginary nonlinear compensation term to obtain a phase-shifted imaginary nonlinear compensation term;
a first summer operably coupled to the phase shifter and configured to combine the downsampled real nonlinear compensation term with the phase-shifted imaginary nonlinear compensation term to obtain an estimated residual distortion; and a second summer operably coupled to the first summer and configured to subtract the estimated residual distortion from the complex digital signal to obtain an equalized complex digital signal.

13. The apparatus of claim 12 wherein the upsampler is further configured to upsample the copy of the complex digital signal by a predetermined factor.

14. The apparatus of claim 13 wherein the predetermined factor is two.

15. The apparatus of claim 12 further including a time-interleaved analog-to-digital converter (TIADC) operably coupled to the upsampler and configured to capture the complex digital signal from an analog waveform.

16. The apparatus of claim 15 further including a plurality of samplers operably coupled to the TIADC and configured to sample the analog waveform, wherein each sampler in the plurality of samplers has a predetermined time delay.

17. The apparatus of claim 16 wherein at least one of the plurality samplers is further configured to sample the analog waveform at a rate below a Nyquist rate of at least one analog-to-digital converter in the TIADC.

18. The apparatus of claim 15 wherein the analog waveform has a bandwidth greater than a Nyquist rate of at least one analog-to-digital converter in the TIADC.

19. The apparatus of claim 18 wherein the analog waveform occupies a frequency band ranging from direct current to a sampling frequency.

20. The apparatus of claim 15 further including:
a receiver operably coupled to the TIADC and configured to receive the analog waveform.

21. The apparatus of claim 12 wherein the downsampler is further configured to downsample the equalized real and imaginary nonlinear compensation terms by a predetermined factor.

22. The apparatus of claim 21 wherein the predetermined factor is two.

23. An apparatus for equalizing a complex digital signal, the apparatus comprising:
means for upsampling a copy of the complex digital signal to obtain an upsampled complex digital signal;
means for separating the upsampled complex digital signal to obtain upsampled in-phase and quadrature components of the complex digital signal;
means for creating real and imaginary nonlinear compensation terms from the upsampled in-phase and quadrature components, respectively, of the complex digital signal;
means for downsampling the real and imaginary nonlinear compensation terms to obtain downsampled real and imaginary nonlinear compensation terms;
means for applying a predetermined phase shift to the downsampled imaginary nonlinear compensation term to obtain a phase-shifted imaginary nonlinear compensation term;
means for combining the downsampled real nonlinear compensation term with the phase-shifted imaginary nonlinear compensation term to obtain an estimated residual distortion; and
means for subtracting the estimated residual distortion of the combined signal from the complex digital signal to obtain an equalized complex digital signal.

* * * * *